May 25, 1943.    J. E. ANDERSON    2,320,164
WELDED ASSEMBLY
Original Filed Sept. 29, 1941
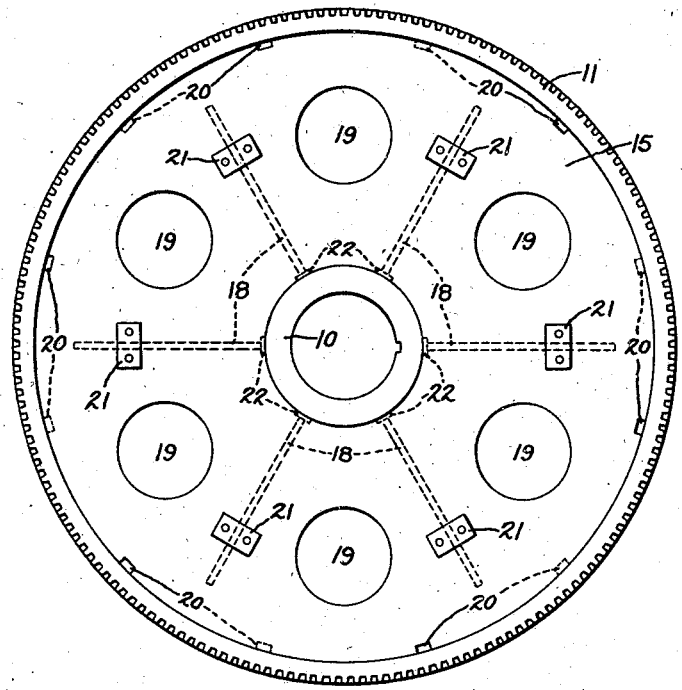
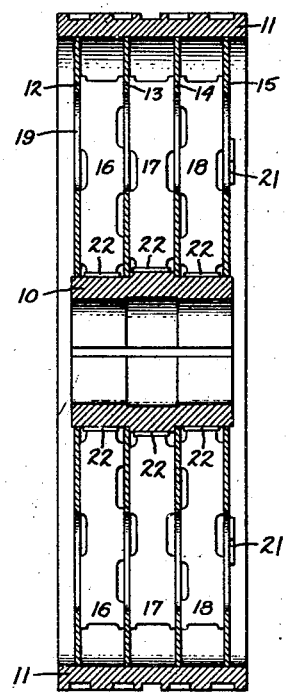
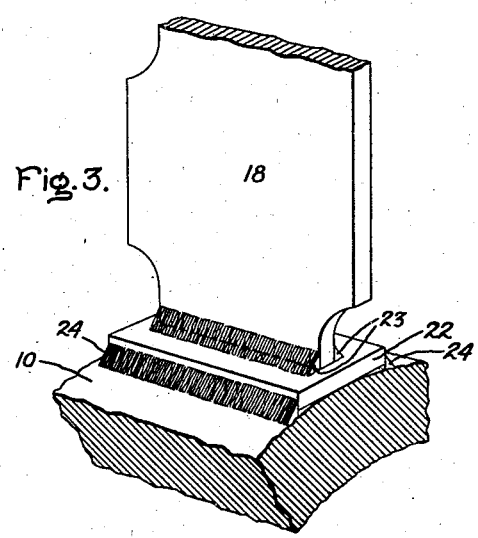
Inventor:
Jasper E. Anderson,
by Harry E. Dunham
His Attorney.

Patented May 25, 1943

2,320,164

UNITED STATES PATENT OFFICE 2,320,164

WELDED ASSEMBLY

Jasper E. Anderson, Saugus, Mass., assignor to General Electric Company, a corporation of New York Original application September 29, 1941, Serial No. 412,913. Divided and this application July 10, 1942, Serial No. 450,443

2 Claims. (Cl. 74—439)

My invention relates to welded assemblies embodying a joint construction whereby contraction strains in fusion welds between rigid members are sufficiently reduced to prevent failure of the welds.

The procedure employed in fabricating such welded assemblies is disclosed and claimed in my parent application Serial No. 412,913, for Fusion welding, filed September 29, 1941.

In the fabrication of certain assemblies by fusion welding, parts being joined are frequently of such rigidity that they cannot move relatively to one another sufficiently to relieve the contraction strains in the solidifying weld metal joining them. The consequent locked up weld stresses cause welds between such parts to crack before or during stress annealing of the welded assembly. The repair of such cracked welds and the re-annealing of the assembly are very expensive and time consuming. Furthermore the re-annealing of the assembly frequently has a detrimental effect on its physical characteristics. For example in the manufacture of speed reducing gears such as used in ship propulsion for reducing the speed of a turbine to a desired operating speed of the propeller, this re-annealing of the welded gear blank reduces the hardness of its tooth section which is very undesirable.

Such gear blanks may comprise a forged or cast steel hub and a forged or cast steel rim of relatively high carbon content welded to one another through the agency of a plurality of low carbon steel plate disks which are stiffened by low carbon steel ribs radiating from the hub and welded thereto and to the side surfaces of the steel disks. In making such a welded gear blank, the inner and outer edges of the disks are welded to the outer and inner surface of the hub and rim and each stiffening rib is welded to the disks it engages before its inner end is welded to the hub. Considerable difficulty has been experienced in welding the inner ends of the ribs to the hub because the rigidity of both the hub and the assembly of ribs and disks causes welds between the ribs and hub to crack before and during annealing of the assembly. As pointed out above, it is quite necessary to eliminate these cracked welds since their repair and the re-annealing of the assembly are accompanied by a lowering of the hardness of the tooth section of the rim and this must be avoided.

It is an object of my invention to provide a fusion welded assembly in which contraction strains in the welds between rigid members are sufficiently reduced to prevent failure of the welds.

It is another object of my invention to provide a joint construction between rigid members in which the deflection of a member forming part of the joint accommodates the contractions of fusion welds used in completing the joint.

It is also an object of my invention to provide an improved welded wheel or gear blank.

Further objects of my invention will become apparent from a consideration of the structure and procedure employed in fabricating the gear illustrated in the accompanying drawing.

In this drawing, Figs. 1 and 2 are side and cross-sectional views of a gear made from a gear blank fabricated in accordance with my invention and Fig. 3 is a detailed view of the welded joint construction employed for relieving contraction strains in the welds connecting the inner ends of its ribs to the outer surface of its rigid hub.

The low speed or bull gear shown in Fig. 1 forms part of a gear reduction for connecting the high speed turbines of a ship to its low speed propeller. For merchant vessels it will be required to transmit from 3000 to 12000 horsepower and for naval combat ships, 25000 horsepower or more. Since the speed reduction between the ship's turbines and the ship's propeller is considerable, a double gear reduction is usually employed. Such an arrangement comprises a low speed gear such as shown in the drawing which is mounted on the propeller shaft and driven by two or more low speed pinions, each of which in turn is driven by a high speed gear which is driven by the high speed pinions of the high pressure, intermediate pressure, and low pressure turbines. The gears are stepped down so that the bull gear is usually astern and below the turbines. The reduction in speed of revolution from turbine to propeller achieved through such a gear reduction may be as high as 85 to 1 or higher. Since the propeller and bull gear illustrated in the drawing usually turn at some speed between 85 and 400 R. P. M. depending on the type of ship, it is quite apparent that this low speed gear, for the horsepower involved, is quite massive in construction. It may be from 50 to 200 inches in diameter and is provided with two rows of teeth which are cut into the rim of the gear blank. It and the other gears of the gear reduction, some of which may also be quite massive and of the same construction, are enclosed in a casing provided with bearings for properly aligning the shafts of the various gears. Flexible couplings are provided to prevent transmission of strains and misalignment from one unit of the gear reduction to another.

The gear shown in Figs. 1 and 2 of the drawing comprises a rigid steel hub 10 and a forged steel rim 11 connected by four plate steel disks 12, 13, 14, and 15. The inner and outer edges of these disks are shaped to provide J grooves in which weld metal is deposited by arc welding to connect their inner and outer edges to the outer and inner surfaces of the hub and rim. It will be noted that a flanged enlargement of the hub at the midportion of its outer surface assists in locating disks 13 and 14 relatively thereto. The side edges of these disks opposite the J grooves are also attached to the hub and rim by fillet welds which seal the joints between these members. These welds are also made by arc welding. The grooves formed in the inner and outer edges of these disks provide lips at the bottom of the grooves which yield to accommodate weld contractions occurring upon the cooling of initial deposits of weld metal therein and subsequent layer deposits of weld metal in these grooves anneal and stress relieve the weld deposit immediately therebelow so that no difficulty is encountered in making crack free fusion welds between these disks and the hub and rim of the gear.

A plurality of stiffening ribs 16, 17 and 18 are located between disks 12, 13, 14 and 15 attached thereto by arc welds. These ribs radiate from the hub and are located in groups between the disks so that the ribs of each group are in substantially the same radial section of the gear. It will be noted that the side edges of each rib are cut away so that for substantially its full length, except at its ends, directly opposite side edges of each rib do not simultaneously engage the side surfaces of the disks. Consequently welds between the contacting portions of the ribs and disks are for the most part not directly opposite one another so that the ribs and disks may yield to accommodate contractions of the solidifying weld metal. It will also be noted that ribs on opposite sides of the same disks have cut away edge portions which accomplish the same result.

The ribs and hub are completely rough machined before being welded into the gear blank assembly. In order to keep unbalance of the gear blank to a minimum the inside diameters of rim and hub are made concentric within a few thousandths of an inch. Furthermore, the inner and outer edges of the disks are machined to form a close fit with the outer and inner surfaces of the hub and rim. The outer edge of each disk may be tapered slightly in order to reduce its thickness and thereby the amount of weld metal employed in connecting it to the rim.

The parts are welded while hot, that is, with a preheat not disagreeable to the welder. The disks are welded to the hub and rim and the reenforcing ribs welded to the disks starting from the inner part of the gear. The grooves for the J welds are formed to face outwardly so that these welds may be easily made. Some of the fillet welds which act as cover welds for these J welds and some of the fillet welds between the reenforcing ribs and the disks will have to be made through openings 19 provided in each of the disks. In order to simplify Figs. 1 and 2 of the drawing, no attempt has been made to indicate or illustrate these welds.

The disks are also provided at their outer edges with openings 20 for draining oil from the inner portions of the gear. These drain openings or slots in adjacent disks are staggered relative to one another as shown in the drawing. Driving lugs 21 are welded to the outside surface of disk 15.

Experience has shown that welds between the inner ends of the ribs and the hub will crack before or during annealing requiring expensive repairs and necessitating reannealing of the assembly which, as pointed out above, it is desirable to avoid in order to prevent reduction in hardness of the gear blank rim in which the gear teeth are cut.

I have discovered that if the assembly of each rib is completed by welding its inner end to a joint member interposed between it and the hub and then welding the ends of this joint member to the hub, weld stresses will be relieved so that the welds joining the joint member with the hub will not crack if provision is made for a distributed deflection of the ends of the joint member. This may be accomplished by using a joint member having a flat surface portion which makes a tangential engagement at its midportion with the outer curved surface of the hub to form tapered gaps between the hub and the joint member at its end portions which permit deflection thereof toward the hub to accommodate the contractions of fusion welds spanning these gaps and joining the ends of this member with the surface of the hub.

The above described joint construction for attaching the inner end of rib 18 to the outer curved surface of rigid hub 10 is shown in Fig. 3. This joint construction embodies a joint member 22 which as illustrated is a flat bar or plate whose midportion is interposed between the rib and the hub. Preferably its midportion is attached by arc welds 23 to the inner end of rib 18 before this rib is inserted in the gear assembly. The rib is then welded in the assembly as above described and the assembly is completed by attaching the ends of joint member 22 to the surface of hub 10 by arc welds 24 which span the tapered gaps between the flat surface of the joint member and the curved surface of the hub. These gaps as pointed out above result from the tangential engagement of the midportion of joint member 22 with the curved surface of hub 10. It is of course apparent that the desired wedge shaped gaps which taper inwardly from welds 24 may be provided by joint members whose surfaces opposite the surface of the hub are properly shaped to accomplish this result. Thus, for example, if the outside surface of hub 10 is flat, where the rib is to be attached thereto, then the opposed surface of joint member 22 may be either curved or otherwise shaped to provide the desired wedge shaped gaps which taper inwardly from its ends to provide for a distributed deflection of its ends when the welds between its ends and the hub contract upon cooling.

The illustration of the joint construction in Fig. 3 has been simplified by omitting the disk members located on each side of the rib and welded thereto. It is of course understood, as has already been stated, that in making the assembly the edges of the rib will be welded to these disk members and the disk members will be welded to the hub before the assembly is completed by welding the inner ends of the rib to the hub through a joint construction embodying my invention. It is also apparent that although I have only illustrated in Fig. 3 the attachment of ribs 18 to hub 10, the other ribs 16 and 17 are attached in like manner.

After the gear blank has been completely assembled by the welding operations above described the gear blank as a whole is stress relieved by annealing in a furnace. This relieves weld stresses and fixes the molecular composition of the steel in the completely assembled gear blank so that subsequent expansion or contraction thereof with temperature changes will be uniform, and the finished gear will maintain its dimensions under continued loading and operation. Thereafter subsequent manufacturing operations are performed on the gear blank to obtain the gear illustrated in the drawing.

It is, of course, apparent that my invention is not limited to arc welding and that its application is not limited to the fabrication of gear blanks. Other forms of fusion welding may be used and my procedure may be used for fabricating similar wheel structures such as are used for rotors of dynamo-electric machines. Such wheel structures for dynamo-electric machines will have in place of the toothed rim of the gear illustrated in the drawing some means for attaching the magnetic circuit of its field or armature. Other wheel-like structures that may embody my invention will readily occur to those skilled in the art. Furthermore my invention need not of necessity be applied in wheel-like structures since it may be used for welding plates and stiffening ribs for said plates to one another and to a support member where the rigidity of the assembly of plates and ribs and the rigidity of the support member requires a joint construction such as disclosed for accommodating weld contractions.

Many variations and modifications of my invention will occur to those skilled in the art and I consequently intend in the appended claims to cover all such modifications and variations.

What I claim as new and desire to secure by Letters Patent of the United States is:

1. A welded assembly comprising a rigid support member, plates having their edges connected by fusion welds to said rigid support member, a rib located between and engaging said plates and having its opposite side edges connected by fusion welds to the sides of said plates, a joint member located between said rigid support member and the adjacent end of said rib, said joint member having end portions that extend from each side of said rib and are spaced from said rigid support member by gaps that taper inwardly from its ends toward its midportion, a fusion weld connecting the end of said rib to the midportion of said joint member, and fusion welds extending across said gaps and connecting the ends of said joint member with said rigid support member.

2. A welded assembly comprising a rim, a rigid hub having a curved outer surface, a plurality of disks having inner and outer curved edges matching the inner and outer surfaces of said rim and said hub and connected thereto by fusion welds, a plurality of ribs extending radially from said hub and located between said disks to which their contacting surfaces are connected by fusion welds, each of said ribs being shaped so that along substantially its full length directly opposite side edge portions thereof do not simultaneously engage the side surfaces of said disks except at its ends, joint members located between and engaging at their midportions said rigid hub and the inner ends of each of said ribs, said joint members having flat surfaces which make tangential engagements at their midportion with the curved outer surface of said hub to form gaps between the end portions of said joint members and said hub, a fusion weld connecting the inner end of each of said ribs to the midportion of each of said joint members associated therewith, and fusion welds extending across said gaps and connecting the ends of said joint members to said hub.

JASPER E. ANDERSON.